Patented July 12, 1932

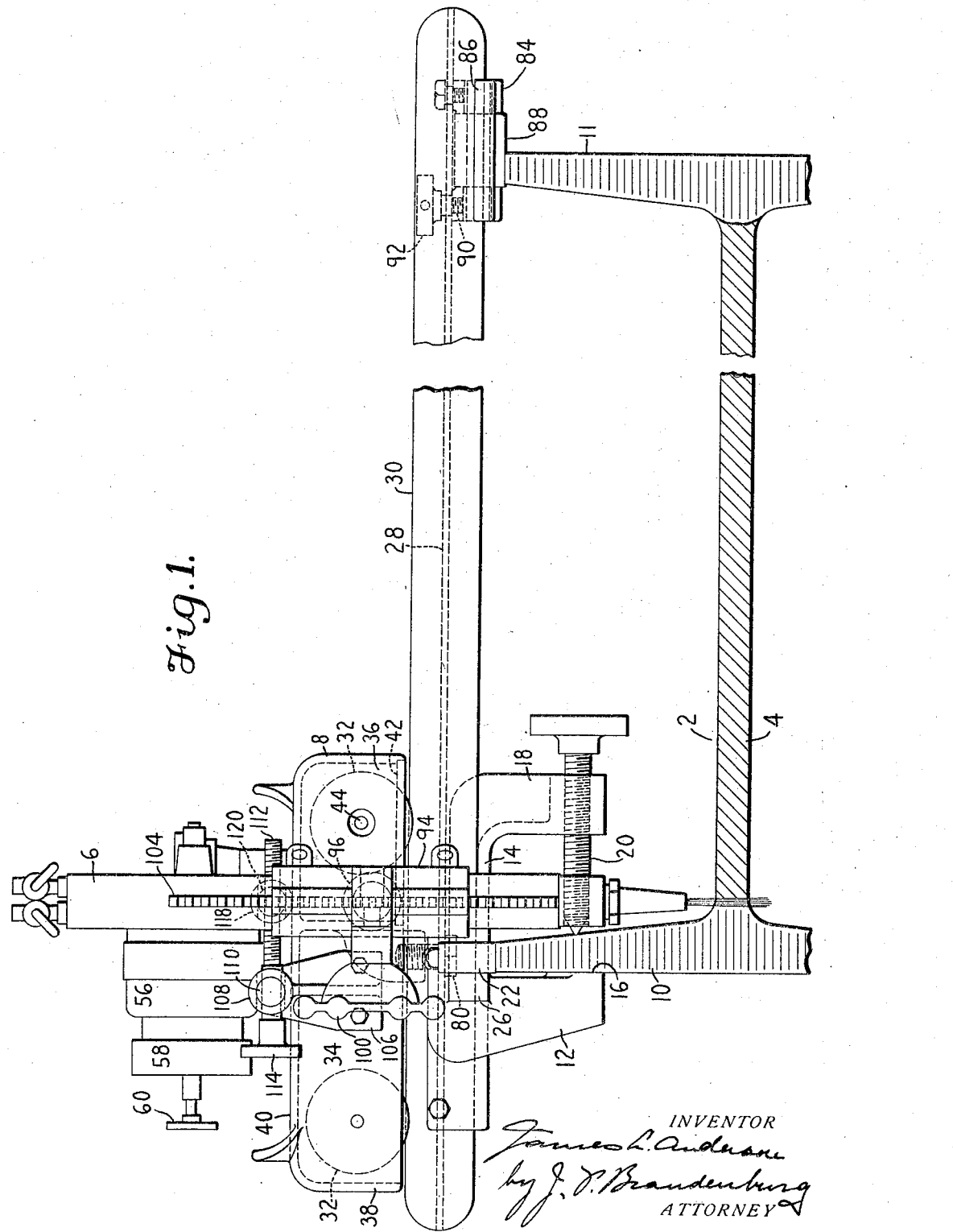

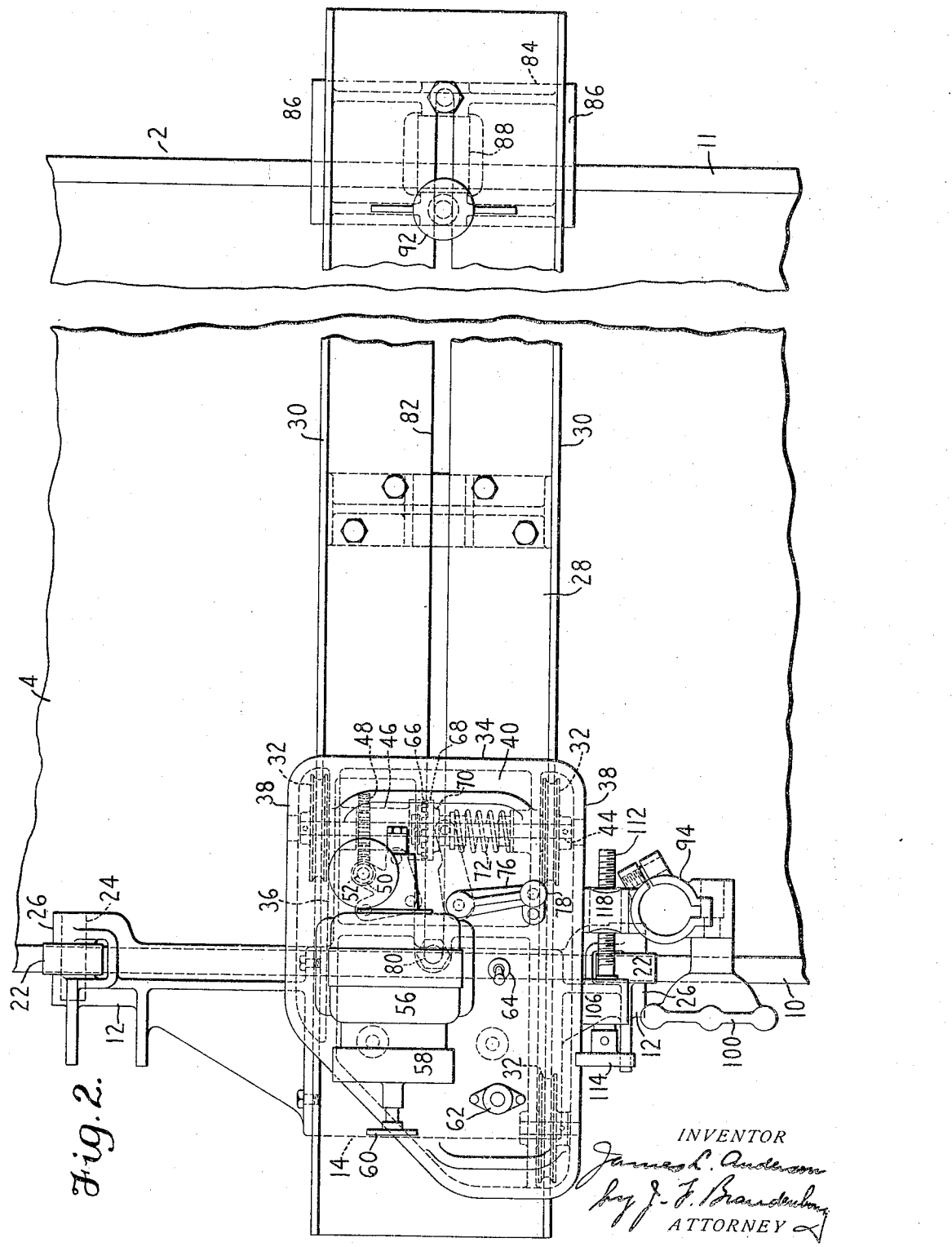

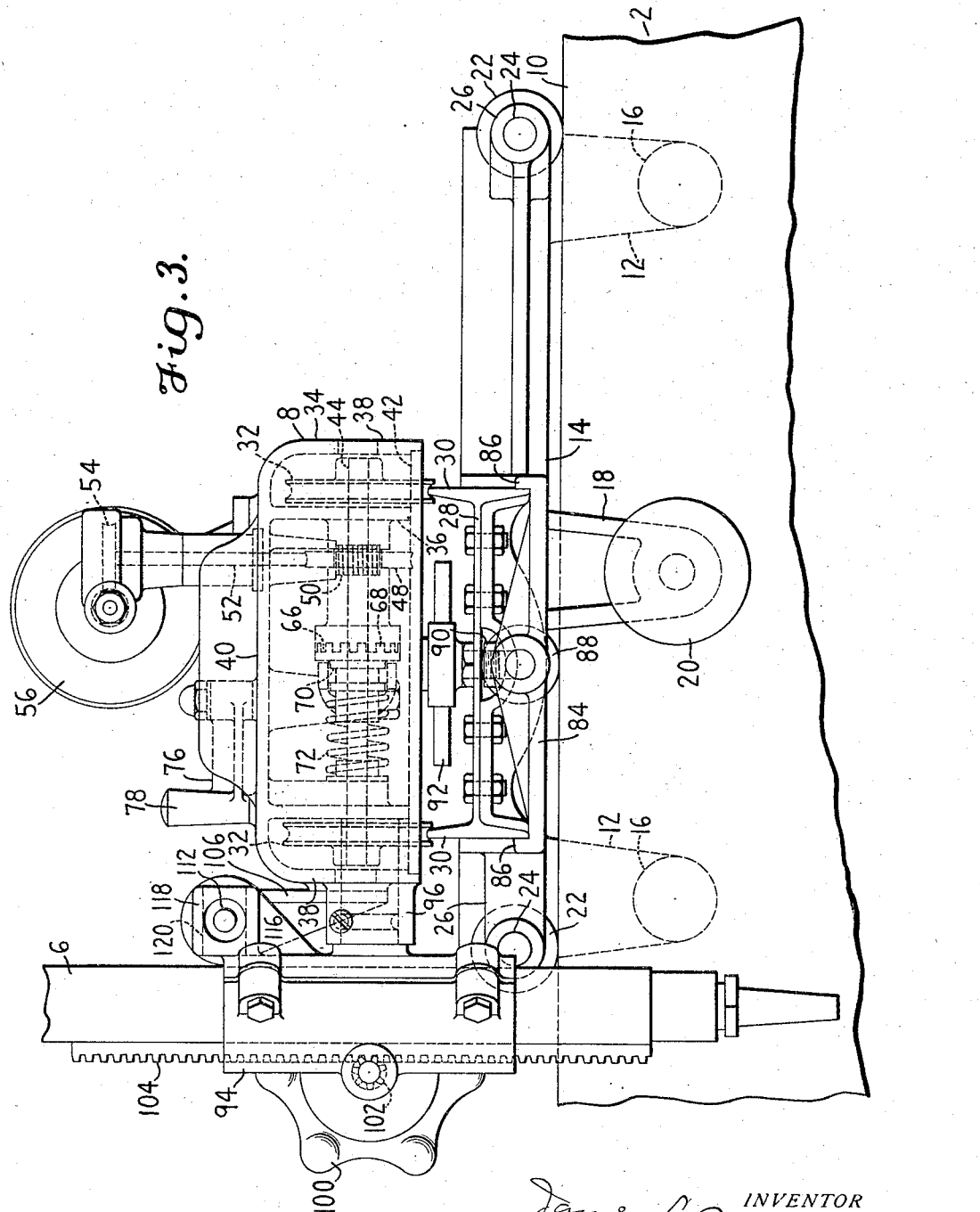

1,867,047

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

TORCH CUTTING MACHINE

Application filed July 30, 1931. Serial No. 553,932.

This invention relates to a machine or apparatus for transverse cutting of flanged shapes, more especially an apparatus to be secured to a flange of a shape, to cut a web or another plate portion disposed at an angle to the anchorage flange. The invention is applicable to the cutting of the webs of H, I or channel shapes. The particular purpose for which the illustrated embodiment of the invention was designed was the cutting of the webs of H columns or beams.

It has been customary to cut H shapes to required lengths with a hand cutting torch, but that leaves much to be desired. A rather complicated and expensive, stationary machine, to which the columns must be brought, having a plurality of torches and means for operating them to cut the flanges and web in one operation, has been proposed.

In the accompanying application Serial No. 553,931, filed July 30, 1931, I disclose a small and simple machine which can be easily carried about and can be affixed first to one flange and then to the other flange of a shape of this character, to cut these parts quickly, cleanly and truly in a mechanical manner, as the term mechanical is understood in this art. The present invention provides another small, carriable machine or apparatus for cutting across the web, thereby completing the severance. Naturally, however, the invention, with or without suitable modification in form, may be applied to other operations.

The general purpose of this invention is to provide a simple, small, light, relatively inexpensive, easily portable machine, which can be instantly positioned to establish the location of the line of cut, which can be quickly and easily affixed to one edge of a flange at any position along its length and when affixed is perfectly trued for the gas cutting operation, which can be easily shifted along the shape to be cut while it is supported by the shape, which is adapted to bridge shapes of different depths and to receive support on the flanges regardless of their spacing, and with which the desired cut can be executed expeditiously, economically and with entire exactitude. Two machines constructed in accordance with the two applications constitute a very advantageous equipment for cutting H columns and the like, minimizing handling by crane or otherwise, of the massive sections, and making possible a severance so smooth and precise that there need be little or no subsequent machining.

Other objects and features of the present invention, and their applicability to the cutting of other specific shapes, will be understood from the disclosure of the present preferred embodiment illustrated in the accompanying drawings and described in the body of the specification.

In the drawings, which form a part hereof:

Fig. 1 is a side elevation of the machine applied to a recumbent H column, the latter being shown in section, both the web of the column, which is to be cut and the bridge or arm of the machine being broken out intermediate the ends, and the flanges of the column being shown as having already been cut;

Fig. 2 is a plan view, only a fragment of the shape to be cut being shown and intermediate portions being broken out as in Fig. 1; and Fig. 3 is taken as a vertical, longitudinal section through the shape, looking at the back of the upstanding flange on which the machine is anchored, showing the machine in elevation from this viewpoint.

The cutting machine is shown applied to an H column 2, the web 4 of which is to be cut by the torch or equivalent thermal cutting device 6 supported upon the carriage 8 of the machine. The beam or column is in horizontal position, with its web horizontal and its flanges 10 and 11 vertical. The machine is retained in fixed relation to one of the flanges of the column by a clamping means. In the drawings the flange to which it is secured is the one marked 10.

The clamping means includes a pair of horizontally spaced arms 12, integral with a clamp frame 14, the body of which is adapted to extend along the top of the flange 10 to which it is secured. Each of these arms is provided with a machined pad 16, upon its inner face, to abut the outer face of the flange 10 at two longitudinally distant points and thereby true the machine in relation to this face. Another arm 18 extends downward from the frame 14 in such position as to be disposed at the inner side of the flange 10 when the machine is applied to column 2. This arm has a screw-threaded passage for a clamp screw 20, which is set against the inner face of the flange 10, in order to fix the frame in predetermined position and relation on the member to be cut.

Top support of the clamp frame on the upstanding flange 10 is obtained by a pair of wheels 22 supported on axles 24, which are solidly held in forks 26 at the opposite ends of the frame 14. These wheels bear firmly on the edge surface of the flange and not only true the machine in reference to the line of the top of the flange, but also enable the machine to be conveniently shifted along the column when the screw 20 is released.

A rigid bridge or beam 28 is secured near one of its ends to a seat in the middle of the top of the clamp frame 14, this bridge being adapted to extend across the beam to be cut, over the web 4. Flanges 30 on the bridge provide trackways for guiding flanged wheels 32 preferably three in number, on the carriage 8.

The carriage 8 has a box-like body 34, including the wheel housings 36, bounding walls 38 and top wall 40, the bottom of the mechanism chamber in the body being closed by a cover plate 42. The side walls are formed with bearings, in two of which is a live axle 44 carrying two of the wheels 32. In a third bearing is held a stub axle carrying the remaining wheel.

Loosely carried upon the axle, within the interior of the body, is a collar 46, secured to which is a worm gear 48, the latter being in mesh with a worm 50 fixed on a vertical shaft 52. The shaft 52 extends upward through the top of the carriage for connection with the vertical shaft of a housed worm gearing 54, which is assembled with and driven by a motor 56. This motor is supported upon the top of the carriage 8 and is provided with a housed governor 58, preferably of the centrifugal make-and-break type, having a knob 60 to adjust the speed of cutting, which is held constant at any adjustment. Power for the motor is secured from a cable connected to the plug-in socket 62, which is connected by suitable wiring with the motor. A switch 64 on the top wall enables the motor to be started and stopped.

The collar 46 has clutch teeth 66 for engagement with teeth 68 on a clutch collar 70, which is slidable on the axle 44 but coupled to it for rotation. The shiftable clutch collar is urged into engagement with the collar 46 by a spring 72.

The clutch collar has a groove engaged by a shifter fork forming one arm of a bellcrank, the pivot of which extends up through the top of the carriage, so that the other arm 76 is above the carriage, this arm being equipped with a handle 78 for opening the clutch.

Fixed to the bottom of carriage 8 is a boss to receive a headed stud 80. The shank of this stud extends down through a longitudinal slot 82 in the web of the bridge 28, so that the head of the stud, which is wider than the slot, is beneath the bridge. In this way means are provided for keeping the carriage captive to the bridge, whenever the machine is carried from place to place. It is consequently impossible to drop the carriage when the machine is lifted and held by the bridge or by the clamp frame.

Support for the bridge 28 on the other flange 11 of the member to be cut is obtained in the following manner. A plate 84 lies beneath the bridge and is formed with upturned ends 86 to embrace its sides. This plate carries a wheel or roller 88 to bear on top of the flange 11, and is formed with a screw-threaded boss 90 which is engaged by a thumb screw 92 extending through the slot 82. With this screw the plate can be clamped to the bridge at any position along the length of the latter. Thus, the distance between the roller 88 and the rollers 22 can be adjusted in conformity with different depths of columns or other shapes to be cut. When the roller 88 has been adjusted, the entire machine can be moved along the flanges 10 and 11 without effort.

The cutting torch may be of the oxygen cutting jet variety, or it may be a means of the kind used in the atomic hydrogen cutting method. It is carried in a holder 94 having a lateral trunnion held pivotally in a bearing 96. The pivoting of the torch-holder enables the torch to be tilted from a vertical position to inclinations either forward or rearward in its plane of movement across the web to be cut. The torch is adjustable lengthwise, up or down, in the holder in the usual manner, by a hand-wheel 100 having a pinion 102 to mesh a rack 104 on the torch.

At the end of the travel of the carriage, the body of the torch or similar thermal cutting device might interfere with the flange 10 or 11 so as to keep the jets from reaching the ends of the cut that must be made through the web. This difficulty can be overcome by tilting the torch or torch holder, but the regulation of the angle of attack is a rather delicate matter, and I have therefore provided a means for accomplishing this purpose in a convenient manner which gives the operator exact control. This adjusting means has a bracket 106 fixed to the carriage 8. In a bearing 108 of this bracket a cylinder 110 can turn, this cylinder having a cross-hole through which the unthreaded portion of an adjusting screw 110 is passed. The adjusting screw has a hand-wheel 114 and is held against moving lengthwise in the pivot 110.

The torch-holder 94 has an arm 116 containing a pivot bearing 118 for a cylinder 120 having a transverse, screw-threaded hole which is engaged by the threaded portion of the adjusting screw. The bearings 108 and 118 have transverse openings large enough to allow for change in the angularity of the screw. Thus, by turning the hand-wheel 114, the torch can be adjusted quickly and exactly to any desired degree of inclination for or aft, even while the cut is being made.

It will be obvious that numerous changes can be made in the construction of the apparatus, without departing from the novelty of the invention set forth in the claims.

I claim:

1. A machine for cutting flanged shapes with a torch or the like, said machine having means for anchoring it over one edge only of a flange of the shape, a bridge extending from said means, a torch carriage guided along said bridge to move transversely of another plate portion of the shape, and means for moving said carriage to advance the cut at uniform speed.

2. A machine for cutting flanged shapes with a torch or the like, said machine having means for anchoring it over one edge only of a flange of the shape, a bridge extending from said means, a torch carriage guided along said bridge to move transversely of another plate portion of the shape, wheels on said carriage to travel on said bridge, and a motor on the carriage geared to said wheels.

3. A machine for cutting flanged shapes with a torch or the like, comprising a supporting structure having a cross bridge and rollers to rest on top of two upstanding flanges, means for anchoring the structure to a flange, a torch-carriage movable along the bridge, and mechanical means for propelling said carriage.

4. A machine for cutting flanged shapes with a torch or the like, comprising a supporting structure having a cross bridge and rollers to rest on top of two upstanding flanges, means for anchoring the structure to a flange, means so that the distance between the rollers to rest on spaced flanges can be changed, a torch-carriage movable along the bridge, and mechanical means for propelling said carriage.

5. A machine for cutting flanged shapes with a torch or the like, comprising a structure adapted to be supported on two upstanding flanges connected by a web, a torch-carriage guided on said structure to traverse the web, and means for advancing said carriage.

6. A machine for cutting flanged shapes with a torch or the like, comprising a structure adapted to be supported on two upstanding flanges connected by a web, means for anchoring said structure to one of the flanges, a torch-carriage guided on said structure to traverse the web, and means for advancing said carriage.

7. A machine for cutting flanged shapes with a torch or the like, comprising a frame and means for anchoring it to an upstanding flange of the shape, a transverse guide, a torch-carriage movable along said guide, means for driving the torch-carriage, and means for adjusting the angularity of the torch to complete the cut into the angle between the flange and web portions of the shape.

8. A machine for cutting flanged shapes with a torch or the like, comprising a slotted cross guide and means for applying it to the upstanding flanged part of the shape, a motor-driven, wheeled torch carriage to travel along said guide, and means holding said carriage captive to said guide.

9. A machine of the character described having clamping means for affixing the machine to one upstanding edge of a member in order to cut a horizontal portion of the same member, a horizontal track fixed to said clamping means, a carriage movable along said track, means for propelling the carriage, and a torch supported on the carriage to cut the horizontal portion of the member.

JAMES L. ANDERSON.